US010528818B1

(12) United States Patent
Rao et al.

(10) Patent No.: US 10,528,818 B1
(45) Date of Patent: Jan. 7, 2020

(54) VIDEO SCENE ANALYSIS SYSTEM FOR SITUATIONAL AWARENESS

(71) Applicant: HRL Laboratories, LLC, Malibu, CA (US)

(72) Inventors: Shankar R. Rao, Agoura Hills, CA (US); Kang-Yu Ni, Calabasas, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 248 days.

(21) Appl. No.: 15/143,471

(22) Filed: Apr. 29, 2016

Related U.S. Application Data

(63) Continuation-in-part of application No. 14/209,136, filed on Mar. 13, 2014, now Pat. No. 9,544,550.

(60) Provisional application No. 62/155,235, filed on Apr. 30, 2015, provisional application No. 61/783,538, filed on Mar. 14, 2013.

(51) Int. Cl.
| G06K 9/00 | (2006.01) |
|---|---|
| G06K 9/46 | (2006.01) |
| G06T 7/20 | (2017.01) |
| H04N 7/18 | (2006.01) |

(52) U.S. Cl.
CPC ...... *G06K 9/00711* (2013.01); *G06K 9/00771* (2013.01); *G06K 9/4671* (2013.01); *G06T 7/20* (2013.01); *H04N 7/183* (2013.01); *G06T 2207/10016* (2013.01)

(58) Field of Classification Search
None
See application file for complete search history.

(56) References Cited

U.S. PATENT DOCUMENTS

| 2004/0131249 | A1* | 7/2004 | Sandrew | G06T 11/001 382/162 |
|---|---|---|---|---|
| 2007/0183661 | A1* | 8/2007 | El-Maleh | G06K 9/00234 382/173 |
| 2010/0067782 | A1* | 3/2010 | Dunn | G06T 11/001 382/162 |

(Continued)

OTHER PUBLICATIONS

Guyon et al. ("Foreground Detection Based on Low-rank and Block-sparse Matrix Decomposition" IEEE Image processing (ICIP) 2012).*

(Continued)

*Primary Examiner* — Kate H Luo
(74) *Attorney, Agent, or Firm* — Tope-McKay & Associates (57) ABSTRACT

Described is a video scene analysis system. The system includes a salience module that receives a video stream having one more pairs of frames (each frame having a background and a foreground) and detects salient regions in the video stream to generate salient motion estimates. The salient regions are regions that move differently than dominant motion in the pairs of video frames. A scene modeling module generates a sparse foreground model based on salient motion estimates from a plurality of consecutive frames. A foreground refinement module then generates a Task-Aware Foreground by refining the sparse foreground model based on task knowledge. The Task-Aware Foreground can then be used for further processing such as object detection, tracking or recognition.

19 Claims, 6 Drawing Sheets

(56) References Cited

U.S. PATENT DOCUMENTS

2012/0027248 A1* 2/2012 Feris ............... G06K 9/00744
382/103

OTHER PUBLICATIONS

Dollár et al., "Pedestrian Detection: An Evaluation of the State of the Art," IEEE Transactions on Pattern Analysis and Machine Intelligence, vol. 34, No. 4, Apr. 2012, pp. 743-760.
Soatto, "Actionable Information in Vision," 2009 IEEE 12th International Conference on Computer Vision (ICCV), pp. 2138-2145.
Ayvaci et al., "Sparse Occlusion Detection with Optical Flow," Int J Comput Vis (2012) 97:pp. 322-338.
Giorgiadis et al., "Actionable Saliency Detection: Independent Motion Detection Without Independent Motion Estimation," CVPR 2012, pp. 646-653.
http://en.wikipedia.org/wiki/F1_score downloaded May 25, 2016.
Candes et al., "Robust Principal Component Analysis?" Journal of the ACM, vol. 58, No. 3. Article 11, Publication date: May 2011, pp. 11-1-11-37.
Peng et al., "RASL: Robust Alignment by Sparse and Low-rank Decomposition for Linearly Correlated Images." IEEE Transactions on Pattern Analysis and Machine Intelligence, vol. 34, No. 11, Nov. 2012, pp. 2233-2246.
E. Candes, X. Li, Y. Ma, and J. Wright, "Robust Principal Component Analysis?", IEEE PAMI 2011.
Y. Peng, A. Ganesh, J. Wright, W. Xu, and Y. Ma, "RASL: Robust Alignment by Sparse and Low-rank Decomposition for Linearly Correlated Images", IEEE PAMI 2011.
A. Waters, A. Sankaranarayanan, and R. Baraniuk. SparCS: Recovering low-rank and sparse matrices from compressive measurements. NIPS, 2011.
J. Wright, A. Ganesh, K. Min, and Y. Ma. Compressive Principal Component Pursuit, ISIT, 2012.
Office Action 1 for U.S. Appl. No. 14/209,136, dated Apr. 6, 2016.
Response to Office Action 1 for U.S. Appl. No. 14/209,136, dated Aug. 8, 2016.
Notice of Allowance for U.S. Appl. No. 14/209,136, dated Aug. 31, 2016.
Ciocoiu, "Foveated compressed sensing," 20th European conference on Circuit Theory and Design 2011.

* cited by examiner

VIDEO SCENE ANALYSIS SYSTEM FOR SITUATIONAL AWARENESS

CROSS-REFERENCE TO RELATED APPLICATIONS

This is a Continuation-in-Part Application of U.S. application Ser. No. 14/209,136, filed on Mar. 13, 2014, which is a non-provisional patent application of U.S. Provisional Application No. 61/783,538, filed on Mar. 14, 2013, entitled, "Low Power Surveillance Camera for Intruder Detection," the entirety of which are incorporated herein by reference.

This is ALSO a non-provisional application of U.S. Provisional Application No. 62/155,235, filed on Apr. 30, 2015.

FIELD OF INVENTION

The present invention relates to a video analysis system and, more particularly, to a video scene analysis system which operates as a front-end video pre-processing module that extracts task-relevant information to pass on to existing object detection, tracking, and recognition algorithms.

BACKGROUND OF INVENTION

Existing methods for persistent surveillance tasks, such as automatic target detection and tracking, often rely on rectangular windows that contain pixels from both the target and background. As a result, target appearance models used for such tasks must essentially be trained against all possible backgrounds. Techniques for modeling the background often require the camera to be static, or require a training sequence with no foreground objects, or cannot handle complex foreground motions. Methods for automatic tracking that use sparse features, such as SIFT or SURF keypoints, often fail in low to medium resolution settings. Alternatively, dense optical flow-based methods for tracking are highly localized and have strict assumptions about the number of motion layers in the scene as well smoothness within motion layers.

While there has been much work on developing automated sensor algorithms for location, classification, identification, and tracking of targets and potential threats, the performance of state-of-the-art (SOA) methods is far from ideal, even under favorable conditions. In particular, false alarm and missed detection rates remain high for low-resolution images, small-scale targets, nonstationary cameras, and in the presence of occlusions, moving clutter, and adverse weather conditions (see, for example, the List of Incorporated Literature References, Reference No. 1).

Thus, a continuing need exists for a scene analysis system that provides pixel-accurate boundaries of complex foreground and moving background, and that greatly improves recognition and detection tasks by eliminating the extraneous background features.

SUMMARY OF INVENTION

This disclosure provides is a video analysis system for situational awareness. In some embodiments, the system includes one or more processors and a memory. The memory is a non-transitory computer-readable medium having executable instructions encoded thereon, such that upon execution of the instructions, the one or more processors perform several operations, such as receiving a video stream having one more pairs of frames, each frame having a background and a foreground; detecting salient regions in the video stream to generate salient motion estimates, the salient regions being regions that move differently than dominant motion in the pairs of video frames; generating a sparse foreground model based on salient motion estimates from a plurality of consecutive frames; and refining the sparse foreground model based on task knowledge to generate a Task-Aware Foreground.

In another aspect, the system performs operations of tracking one or more objects in the Task-Aware Foreground.

In yet another aspect, in generating a sparse foreground model, salient motion estimates are collected from the plurality of consecutive frames into a data matrix, where each column corresponds to an image frame, the data matrix being decomposed into a low-rank component corresponding to the background and a sparse foreground model corresponding to the foreground.

Further, in detecting salient regions in the video stream to generate salient motion estimates, the salient motion estimates are generated using actionable information (ActInfo).

Additionally, in generating a sparse foreground model, the sparse foreground model is generated using sparse low-rank decomposition (SLRD).

In yet another aspect, in generating a Task-Aware Foreground, the Task-Aware Foreground is generated using actionable information (ActInfo).

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a video analysis system and, more particularly, to a video scene analysis system which operates as a front-end video pre-processing module that extracts task-relevant information to pass on to existing object detection, tracking, and recognition algorithms. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.
1. Dollár et al., "Pedestrian Detection: An Evaluation of the State of the Art," IEEE PAMI, 2011.
2. Soatto, "Actionable Information in Vision," ICCV, 2009.
3. Ayvaci et al., "Sparse Occlusion Detection with Optical Flow," IJCV, 2012.
4. Giorgiadis et al., "Actionable Saliency Detection: Independent Motion Detection Without Independent Motion Estimation," CVPR, 2012.
5. en.wikipedia.org/wiki/F1_score, taken on Feb. 2, 2016
6. Candes et al., "Robust Principal Component Analysis?" JACM, 2011.
7. Peng et al., "RASL: Robust Alignment by Sparse and Low-rank Decomposition for Linearly Correlated Images," IEEE PAMI, 2011.

(2) PRINCIPAL ASPECTS

The present invention has three "principal" aspects. The first is a video scene analysis system. The system is typically in the form of a computer system operating software or in the form of a "hard-coded" instruction set. This system may be incorporated into a wide variety of devices that provide different functionalities. The second principal aspect is a computer implemented method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
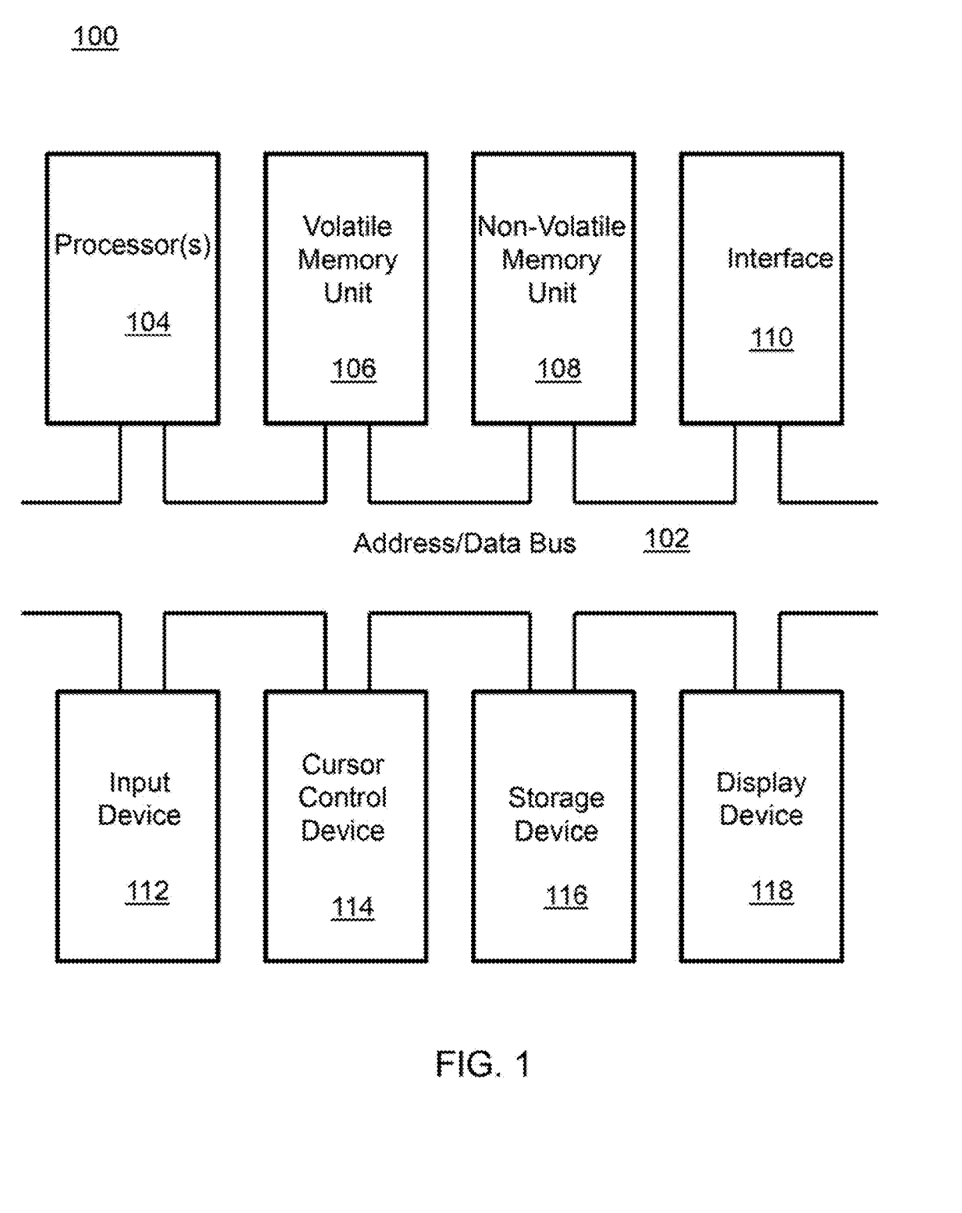
FIG. 1 is a block diagram depicting the components of a camera system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as a video camera or any other sensor as may be applicable or desired for a surveillance system. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
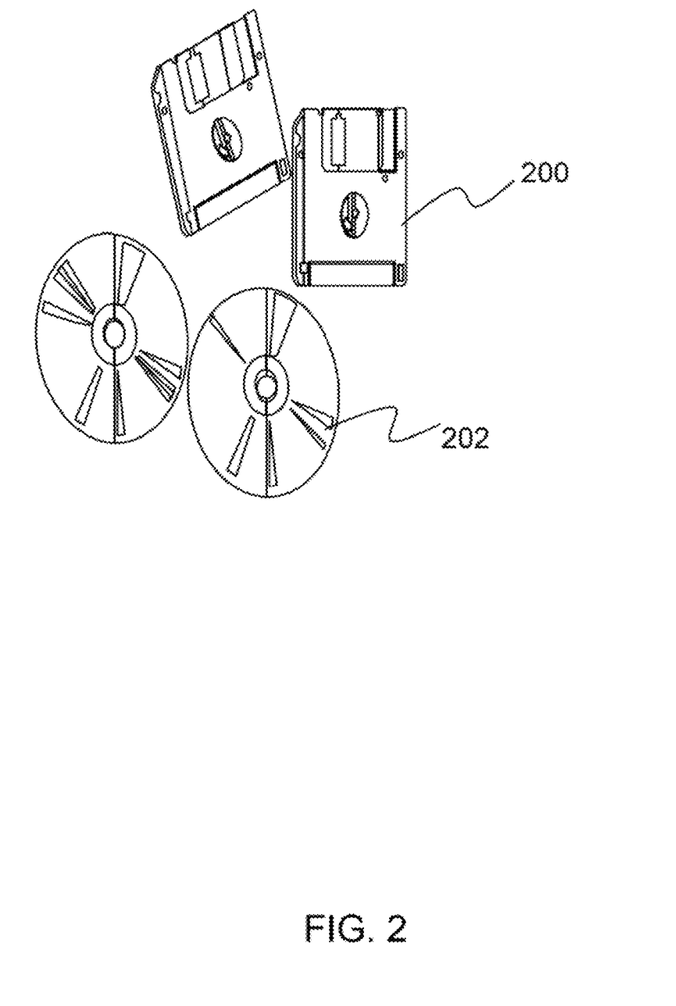
FIG. 2 is an illustration of a computer program product embodying an aspect of present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Figure 3:
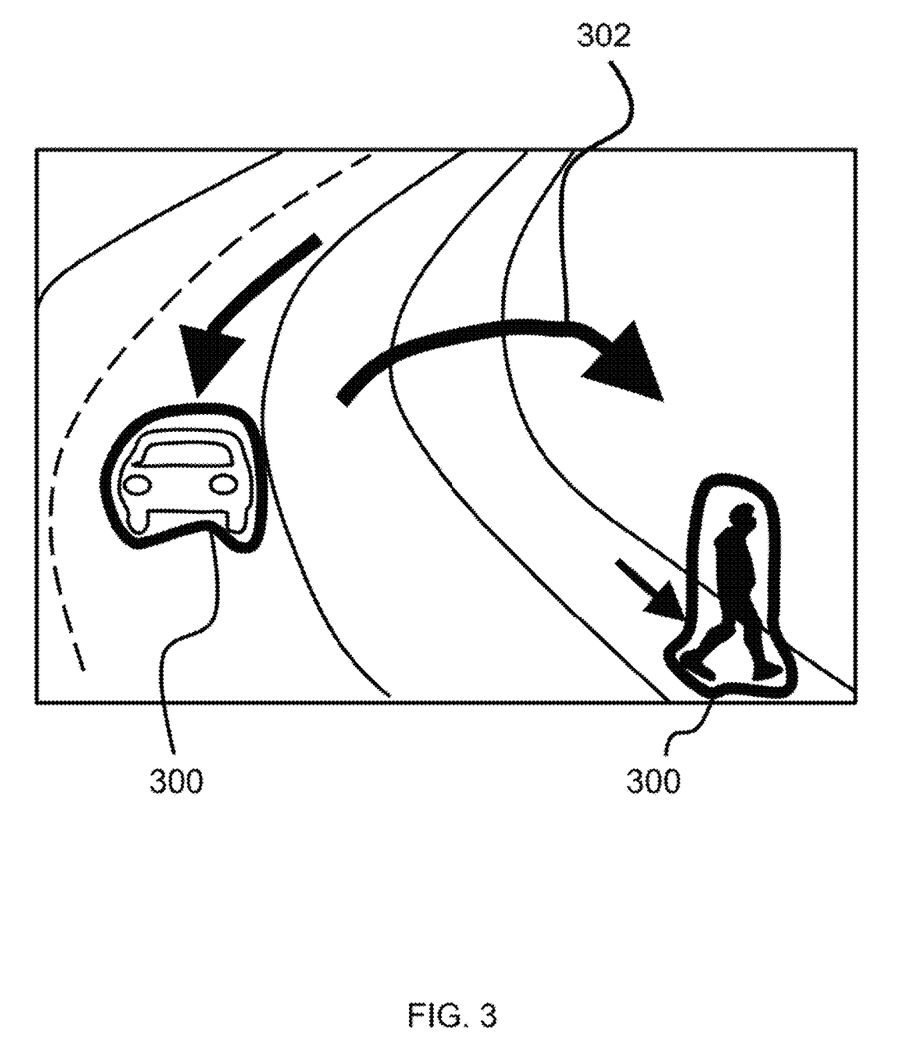
FIG. 3 is an illustration of a conceptual example of decomposing a video scene into moving foreground targets and a moving background.

This disclosure provides a video scene analysis system which operates as a front-end video pre-processing module that extracts task-relevant information to pass on to existing object detection, tracking, and recognition algorithms. As shown in FIG. 3, the module performs holistic video scene analysis that decomposes a raw video stream obtained from a non-stationary camera into pixel-accurate holistic models for multiple moving foreground targets 300 of interest and a moving background 302.

The holistic models avoid reliance on sparse features in the image, reducing false alarms and missed detections of low-resolution and faraway targets, and increasing the robustness of tracking and detection methods in the presence of occlusions and clutter. The system combines two key innovations: Actionable Information (ActInfo) and Sparse/Low-Rank Decomposition (SLRD). ActInfo prescribes how to measure the task-relevant information content of a visual scene once all of the task-specific nuisances are factored out, and is used to both find initial salient motion cues and refine holistic models to incorporate mission-specific prior knowledge. SLRD is a suite of provably correct and efficient tools for finding and extracting many kinds of low-complexity structures from high dimensional data.

The system for holistic video pre-processing for scene analysis benefits many of the technologies used in unattended ground sensor systems, tactical surveillance systems, and autonomous platforms and vehicles. In addition to greatly reducing the number of false alarms and missed detections, the pre-processing system will also directly improve location, classification, and identification of targets. It can be used to further reduce false alarms as a component of a data fusion system, by only fusing the structures needed for the given task. The holistic scene analysis framework can also be easily adapted to improve video compression techniques and on-camera video motion detection.

The system can be implemented with many kinds of imaging systems, such as those used for persistent surveillance, factory monitoring, and helping to robustly detect intruders and anomalous activity. The system can also be used in fully and semi-autonomous platforms, providing active safety warnings for a driver or robustly detecting obstacles and/or targets of interest for autonomously controlled systems. The system can also be used to reduce onboard memory storage requirements of intelligent imaging systems as well as reduce bandwidth needed to transmit video data.

(4) SPECIFIC DETAILS OF THE INVENTION

Figure 4:
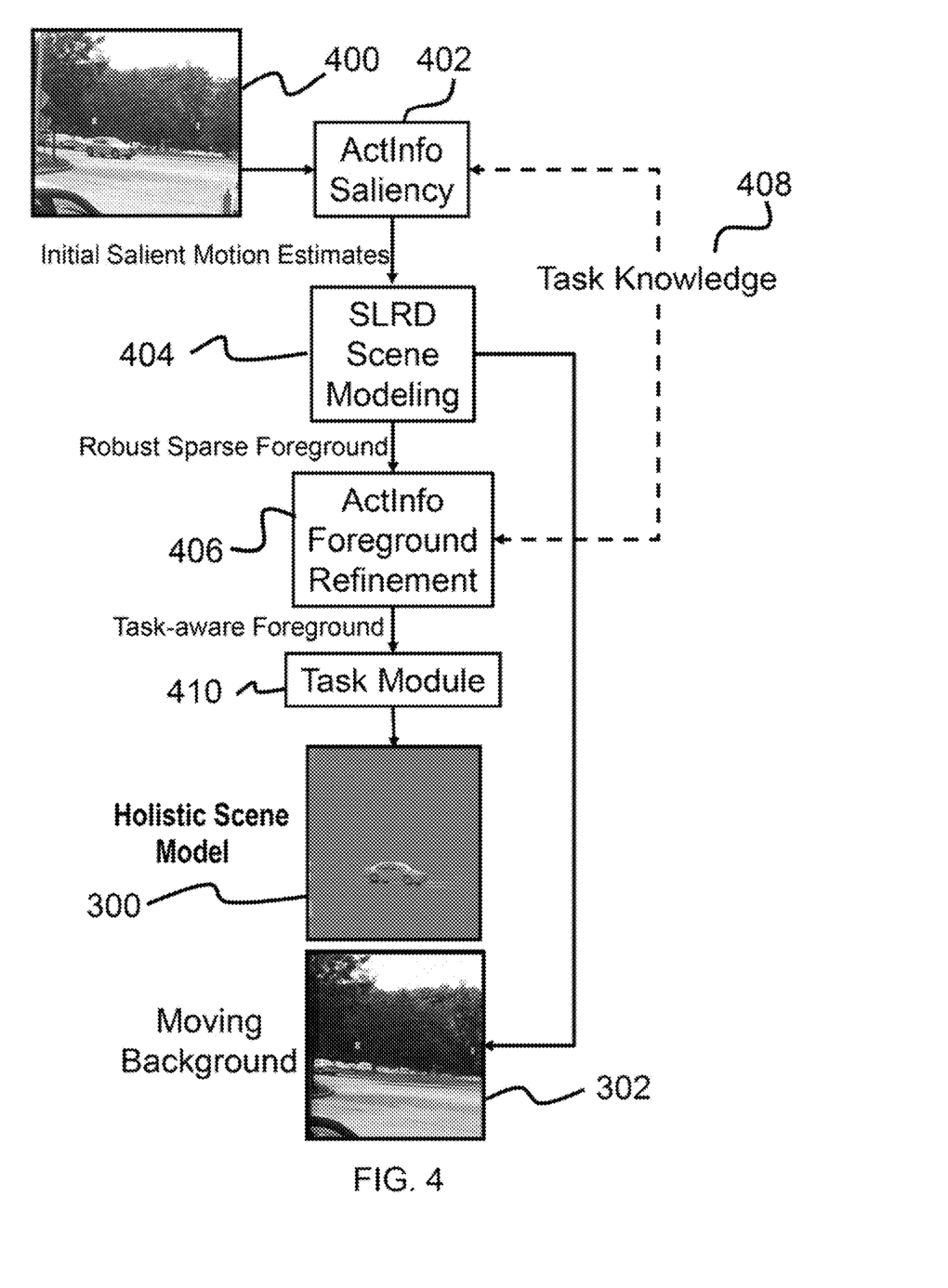
FIG. 4 is a flowchart depicting architecture for a video scene analysis system according to various embodiments of the present invention.

As noted above, this disclosure provides a video scene analysis system. The architecture of the video scene analysis system is depicted in FIG. 4. In operation, a raw video stream 400 (e.g., video frames) is input to a saliency module 402 (based on ActInfo) that obtains initial motion cues from pairs of frames. Collections of these motion cues over several frames are input into a scene modeling module 404 based on nonlinear extensions of SLRD which generates a robust foreground and moving background 302. The holistic models (i.e., robust or sparse foreground) output by the SLRD scene modeling module 404 are refined using a foreground refinement module 406 (based on ActInfo) to incorporate task-specific prior knowledge 408 (such as object continuity) to generate a Task-Aware Foreground. The Task-Aware Foreground, stripped of all nuisance factors is then input into a task module 410 performing the task of interest, such as a tracker or detector, which generates the moving foreground targets 300. At each stage of the pipeline, false alarms and missed detections are reduced. These stages are described in further detail below.

(4.1) Saliency Module and Foreground Refinement Module (Actionable Salience and Structure)

As noted above, the saliency module 402 is based on ActInfo and receives a raw video stream to obtain or generate initial motion cues from pairs of frames in the video stream. ActInfo is an operational notion of task-relevant information that has been developed for visual decision and control tasks (see Literature Reference No. 2 for a description of ActInfo). More formally, ActInfo is defined as the complexity (e.g., coding length) of the maximal invariant statistics (functions of the measured data) relative to the task- and context-dependent nuisances of the data formation process. ActInfo theory measures the volume of the portion of the data that matters for the given task. For instance, for the tasks of detection, localization and recognition, some examples of task-specific nuisances that should not change the output decision are viewpoint, illumination, quantization, partial occlusions, and cast shadows.

Figure 5:
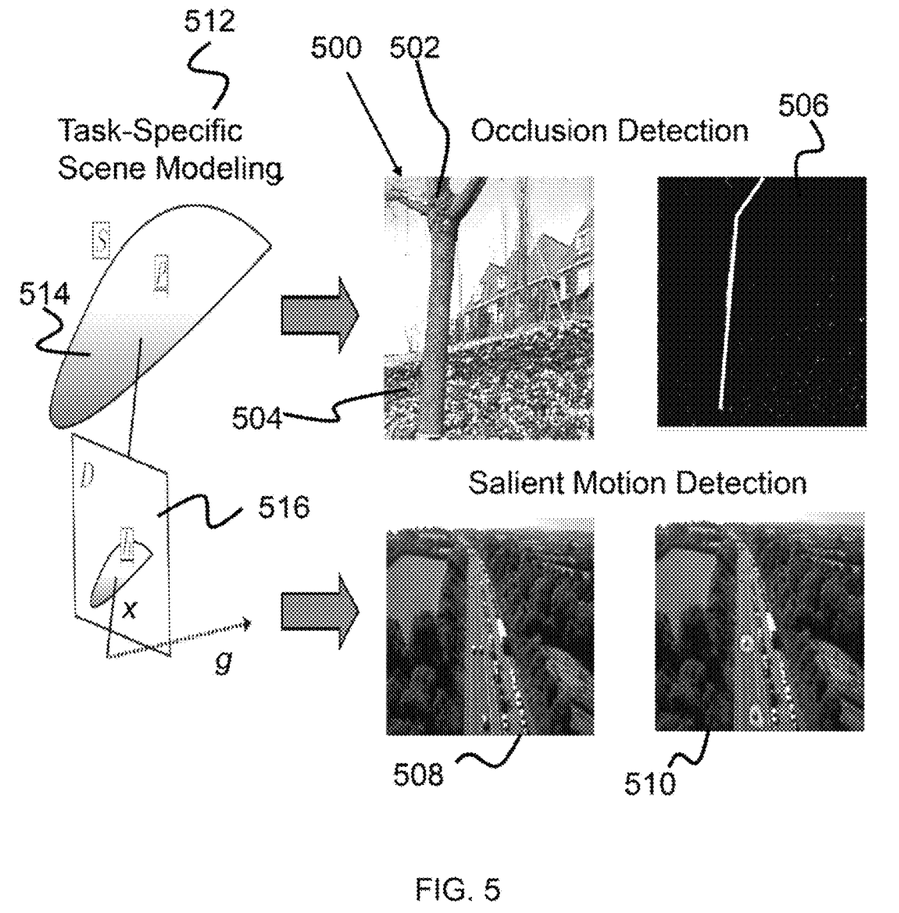
FIG. 5 is an illustration depicting applications of Actionable Information (ActInfo) for occlusion detection and salient motion detection.

In the famous flowerbed sequence in FIG. 5 (top middle 500), the tree 502 in the foreground appears to move faster than the flowerbed 504 due to motion parallax, and occludes and reveals portions of the flowerbed as it does so. By measuring the task-relevant information as the new scene content revealed in each frame, one can use ActInfo as an effective occlusion detector (top right 502) (see Literature Reference No. 3 for a description of using ActInfo for occlusion).

The system also uses ActInfo to detect salient motions, where saliency is defined as motion that deviates from the motion of the camera (see Literature Reference No. 4 for a description of using ActInfo to detect salient motion). For example, in the bottom-left 508 image in FIG. 5, one can see a freeway in which the cars in the right lanes are all moving in the same direction (i.e., the dominant motion in the scene), moving away from the camera. Alternatively, the left lanes include a few vehicles that are moving toward the camera and, as such, deviate from the motion of the camera. The bottom-right 510 image depicts the salient motion detection as provided by ActInfo. This capability is much more powerful than conventional background subtraction, in which the camera is stationary and anything that moves is consider salient. For a moving background, ActInfo-based saliency detection of temporal adjacent images provides reliable camera motion estimates as input for the SLRD scene modeling module. ActInfo-based methods have proven to be more effective than traditional robust salient motion detectors, such as random sample consensus (RANSAC), achieving an average F-measure score (see Literature Reference No. 5) of 0.874 compared to 0.527 for RANSAC on a set of 15 videos (see, for example, Literature Reference No. 4). As an approach based on finding the minimal information for maximally invariant statistics, ActInfo can find salient motions in as little as two consecutive video frames, but ActInfo does not have strong optimality guarantees as do SLRD-based algorithms.

For further understanding, the left side of FIG. 5 is an abstract depiction of the task-specific scene modeling 512 performed by ActInfo. A 3-D scene S with an object ρ 514 is projected onto the image plane D 516. In the image plane D 516, h is the projection of the object ρ.

In the framework described in this disclosure, ActInfo is also applied after the SLRD scene modeling (via the foreground refinement module) to incorporate task-specific prior knowledge, such as contiguity of objects into the holistic models obtained from the SLRD scene modeling module. ActInfo provides a way to properly treat nuisances such as occlusions, quantization, and noise and exploits prior knowledge when available in order to focus on task-relevant scene information and remove task-specific nuisances. This improves detection and tracking performance under nuisance factors, such as lighting changes in the scene, scaling changes, rotation and partial occlusion in moving targets.

(4.2) SLRD Scene Modeling Module (Sparse/Low-Rank Holistic Modeling)

Figure 6:
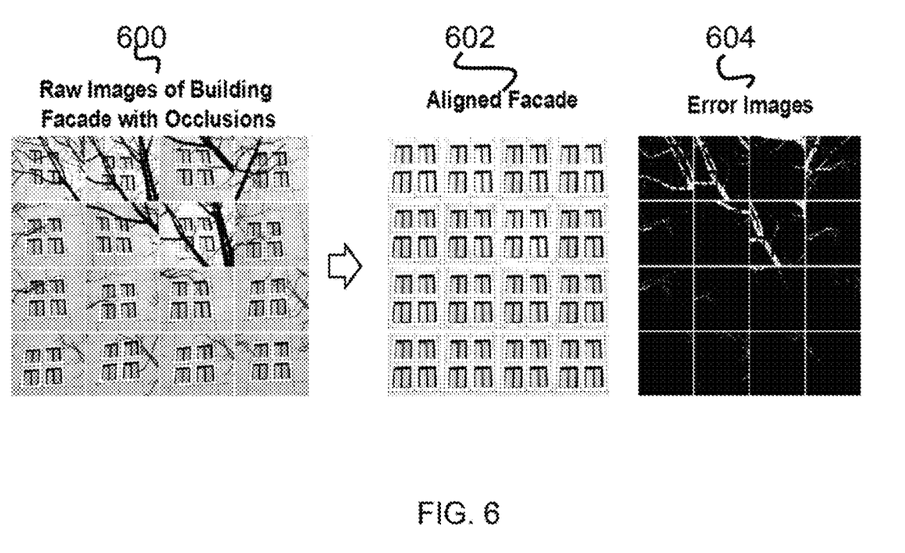
FIG. 6 is an example depicting the application of sparse and low-rank decomposition (SLRD) for aligning different views of a building facade despite occlusions by a tree branch.

To further reduce false alarms and missed detections, the system performs holistic video scene modeling using the sparse and low-rank decomposition (SLRD) techniques. SLRD is a set of provably optimal and efficient mathematical techniques for identifying and decomposing low-complexity structures of the scene from high-dimensional raw data (see, for example, Literature Reference Nos. 6 and 7 for a description of SLRD). Using SLRD, the input high-dimensional data matrix D is decomposed into a low rank matrix A (i.e., the columns of A can all be represented as linear combinations of a few basis vectors) and a sparse matrix E (i.e., E has few nonzero entries). In the context of this system, each column of the input matrix D corresponds to an image frame, the low rank matrix A that corresponds to the background scene and the sparse matrix E that corresponds to the sparse foreground objects whose motion differs from the camera motion. SLRD performs the decomposition by solving a nonlinear optimization problem of the form:

$$\operatorname*{argmin}_{A,E,\tau} \|A\|_* + \lambda \|E\|_1 \text{ such that } D \circ \tau = A + E$$

where $\|A\|_*$ is the sum of the singular values of A, $\|E\|_1$ is the absolute sum of entries of E, and τ is a set of transformations that align the images in D. As shown in FIG. 6, this technique has been successful in aligning batches of images to get the background when the images are not aligned. For example, raw images 600 of a building façade with occlusions are input in to the SLRD Scene Modeling Module, which aligns of the images to generate the background (i.e., aligned facade 602) and extract the occlusions (i.e., error images 604), which in this case is the sparse foreground.

The system extends this technique to align the video scene with camera motion and obtain the moving objects from the sparse matrix. SLRD is globally optimal for finding structures such as illumination and occlusion but only locally optimal for nonlinear structures, such as camera motion. Therefore, it requires reasonable initial estimates for moving camera videos. Furthermore, SLRD requires more data than ActInfo, but the accuracy improves with dimensionality. Therefore, these two techniques are complementary in this framework.

To better understand how ActInfo and SLRD work together to reduce false alarms and missed detections, their use is illustrated on the sample as shown in FIG. 4. Pairs of raw video frames (i.e., video stream 400) are input into the ActInfo Saliency modules 402, which detects salient regions as those that move differently than the dominant motion in the pairs of video frames. The ActInfo Saliency modules 402 use local features on a coarse spatial grid from the pair of frames to obtain a rough estimate of the salient motions, as in FIG. 5 (lower right 510). The salient motion estimates are a set of pixel coordinate translations for a given salient object between consecutive frames. While the salient motion estimates are not pixel-accurate, but they are used to calculate a reasonable initialization of the transformation parameter r used in the SLRD module 404.

The SLRD module 404 collects salient motion estimates from several (at least 10) consecutive frames into a data matrix where each column corresponds to an image frame, and decomposes the matrix into a low-rank component (corresponding to background), and sparse component (corresponding to foreground). The SLRD module 404 assumes the sparse foreground pixels are uniformly distributed with in the image and statistically independent of one another, an assumption that is violated for contiguous objects. Thus the foreground model output by the SLRD module 404 is refined by another module based on ActInfo (i.e., the foreground refinement module 406). This ActInfo-based foreground refinement module 406 uses task knowledge 408, such as the contiguous nature of foreground objects, as well as their shape and appearance, to improve the pixel accuracy of the foreground model obtained from SLRD module 404 and generate a Task-Aware Foreground. The Task Aware Foreground is the bounding outline of a salient object shrunk down to encompass only pixels of the salient object. Alternatively, the Task Aware Foreground is the minimum set of pixels defining a salient object. The Task-Aware Foreground is then used by a task module 410 for the given task (such as recognition, tracking, or any other task that can benefit from using a Task-Aware Foreground). As a non-limiting example, the task module 410 is a tracking module that is used to track a foreground object in a scene based on receiving the Task-Aware Foreground. An example of such a task module 410 is that of the Kanade-Lucas-Tomasi (KLT) feature tracker (Carlo Tomasi and Takeo Kanade. Detection and Tracking of Point Features, Carnegie Mellon University Technical Report CMU-CS-91-132, April 1991), which is incorporated by reference as though fully set forth herein. The resulting task performance is significantly increased because each stage of the pipeline removes potential false alarms and missed detections caused by inaccurate modeling of the scene. Thus, combining ActInfo and SLRD for efficiently and simultaneously modeling a moving background and detecting multiple moving objects does not require foreground-less training sequences, obtains more compact representation of scene than treating each video frame independently, and obtains more accurate segmentation of moving objects, even for low-resolution videos and faraway targets, despite nonlinear nuisances.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A video analysis system for situational awareness, the system comprising:
   one or more processors and a memory, the memory being a non-transitory computer-readable medium having executable instructions encoded thereon, such that upon execution of the instructions, the one or more processors perform operations of:
      receiving a video stream having one more pairs of frames, each frame having a background and a foreground;
      detecting salient regions in the video stream to generate salient motion estimates;
      generating a sparse foreground model based on salient motion estimates from a plurality of consecutive frames;
      refining the sparse foreground model based on task knowledge, including prior knowledge of a contiguous nature of foreground objects, to generate a Task-Aware Foreground, the Task-Aware Foreground being an image having a bounding outline of a salient object shrunk down to encompass only pixels of the salient object or an image having a minimum set of pixels defining the salient object; and
      wherein in generating a sparse foreground model, salient motion estimates are collected from the plurality of consecutive frames into a data matrix, where each column corresponds to an image frame, the data matrix being decomposed into a low-rank component corresponding to the background and a sparse foreground model corresponding to the foreground.

2. The system as set forth in claim 1, further comprising operations of tracking one or more objects in the Task-Aware Foreground.

3. The system as set forth in claim 1, wherein in detecting salient regions in the video stream to generate salient motion estimates, the salient motion estimates are generated using actionable information (ActInfo).

4. The system as set forth in claim 1, wherein in generating a sparse foreground model, the sparse foreground model is generated using sparse low-rank decomposition (SLRD).

5. The system as set forth in claim 1, wherein in generating a Task-Aware Foreground, the Task-Aware Foreground is generated using actionable information (ActInfo).

6. The system as set forth in claim 1, further comprising operations of tracking one or more objects in the Task-Aware Foreground; and
    wherein in detecting salient regions in the video stream to generate salient motion estimates, the salient motion estimates are generated using actionable information (ActInfo);
    wherein in generating a sparse foreground model, the sparse foreground model is generated using sparse low-rank decomposition (SLRD); and
    wherein in generating a Task-Aware Foreground, the Task-Aware Foreground is generated using actionable information (ActInfo).

7. The system as set forth in claim 1, wherein the Task-Aware Foreground is generated based on task-specific prior knowledge and stripped of nuisance factors.

8. A method for video analysis for situational awareness, the method comprising an act of:
    causing one or more processors to execute instructions encoded on a non-transitory computer-readable medium, such that upon execution, the one or more processors perform operations of:
        receiving a video stream having one more pairs of frames, each frame having a background and a foreground;
        detecting salient regions in the video stream to generate salient motion estimates;
        generating a sparse foreground model based on salient motion estimates from a plurality of consecutive frames;
        refining the sparse foreground model based on task knowledge, including prior knowledge of a contiguous nature of foreground objects, to generate a Task-Aware Foreground, the Task-Aware Foreground being an image having a bounding outline of a salient object shrunk down to encompass only pixels of the salient object or an image having a minimum set of pixels defining the salient object; and
        wherein in generating a sparse foreground model, salient motion estimates are collected from the plurality of consecutive frames into a data matrix, where each column corresponds to an image frame, the data matrix being decomposed into a low-rank component corresponding to the background and a sparse foreground model corresponding to the foreground.

9. The method as set forth in claim 8, further comprising an act of tracking one or more objects in the Task-Aware Foreground.

10. The method as set forth in claim 8, wherein in detecting salient regions in the video stream to generate salient motion estimates, the salient motion estimates are generated using actionable information (ActInfo).

11. The method as set forth in claim 8, wherein in generating a sparse foreground model, the sparse foreground model is generated using sparse low-rank decomposition (SLRD).

12. The method as set forth in claim 8, wherein in generating a Task-Aware Foreground, the Task-Aware Foreground is generated using actionable information (ActInfo).

13. The method as set forth in claim 8, further comprising an act of tracking one or more objects in the Task-Aware Foreground; and
    wherein in detecting salient regions in the video stream to generate salient motion estimates, the salient motion estimates are generated using actionable information (ActInfo);
    wherein in generating a sparse foreground model, the sparse foreground model is generated using sparse low-rank decomposition (SLRD); and
    wherein in generating a Task-Aware Foreground, the Task-Aware Foreground is generated using actionable information (ActInfo).

14. A computer program product stored on a non-transitory computer readable medium for video analysis for situational awareness, the computer program product comprising:
    executable instructions stored on a non-transitory computer readable medium, such that upon execution of the instructions by one or more processors, the one or more processors perform operations of:
        receiving a video stream having one more pairs of frames, each frame having a background and a foreground;
        detecting salient regions in the video stream to generate salient motion estimates;
        generating a sparse foreground model based on salient motion estimates from a plurality of consecutive frames;
        refining the sparse foreground model based on task knowledge, including prior knowledge of a contiguous nature of foreground objects, to generate a Task-Aware Foreground, the Task-Aware Foreground being an image having a bounding outline of a salient object shrunk down to encompass only pixels of the salient object or an image having a minimum set of pixels defining the salient object; and
        wherein in generating a sparse foreground model, salient motion estimates are collected from the plurality of consecutive frames into a data matrix, where each column corresponds to an image frame, the data matrix being decomposed into a low-rank component corresponding to the background and a sparse foreground model corresponding to the foreground.

15. The computer program product as set forth in claim 14, further comprising instructions for causing the one or more processors to perform an operation of tracking one or more objects in the Task-Aware Foreground.

16. The computer program product as set forth in claim 14, wherein in detecting salient regions in the video stream to generate salient motion estimates, the salient motion estimates are generated using actionable information (ActInfo).

17. The computer program product as set forth in claim 14, wherein in generating a sparse foreground model, the sparse foreground model is generated using sparse low-rank decomposition (SLRD).

18. The computer program product as set forth in claim 14, wherein in generating a Task-Aware Foreground, the Task-Aware Foreground is generated using actionable information (ActInfo).

19. The computer program product as set forth in claim 14,
    further comprising instructions for causing the one or more processors to perform an operation of tracking one or more objects in the Task-Aware Foreground; and wherein in detecting salient regions in the video stream to generate salient motion estimates, the salient motion estimates are generated using actionable information (ActInfo);

wherein in generating a sparse foreground model, the sparse foreground model is generated using sparse low-rank decomposition (SLRD); and wherein in generating a Task-Aware Foreground, the Task-Aware Foreground is generated using actionable information (ActInfo).

* * * * *